3,053,788
UREA-FORMALDEHYDE RESINS PLASTICIZED WITH AN IMIDAZOLINE DERIVATIVE
Peter Blackman, Cranston, and John P. Conbere, Barrington, R.I., assignors to Arnold Hoffman & Co., Providence, R.I., a corporation of Rhode Island
No Drawing. Filed Aug. 12, 1960, Ser. No. 49,167
10 Claims. (Cl. 260—30.2)

The present invention relates to plasticized urea formaldehyde resins and compositions containing the same.

The principal object of the invention is to provide novel urea formaldehyde resin compositions of improved flexibility. A more particular object of the invention is to provide urea formaldehyde resin compositions which can be cured into flexible films and coatings having other desirable characteristics. Additional objects will also be hereinafter apparent.

Broadly stated, the compositions of the invention comprise a urea-formaldehyde resin and, as a plasticizer therefor, an effective amount of an imidazoline derivative, which in its free base form, has the formula:

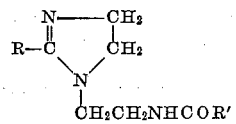

wherein R and R' are saturated alkyl groups, either straight or branched chain, containing from two to nine carbon atoms. Typically suitable imidazoline derivatives are 2-heptyl-3(β-caprylamidoethyl) imidazoline, 2-isononyl-3-(isodecanoamidoethyl) imidazoline, 2-ethyl-3(propionamidoethyl) imidazoline, 2-pentyl-3-(caproamidoethyl) imidazoline, 2-(3-heptyl)-3-(2-ethylhexamidoethyl) imidazoline, 2-(2-pentyl)-3-(2-methylpentamiodethyl) imidazoline and 2(n-propyl)-3-(butyramidoethyl) imidazoline, and the acid salts thereof, e.g. the acetates and other lower carboxylic acid salts.

The imidazoline derivatives used herein may be prepared by reacting diethylene triamine and an appropriate long chain alkanoic acid, typically isodecanoic acid. The reaction is preferably carried out by refluxing the reactants in the presence of an inert organic solvent, e.g. xylene, followed by azeotropic removal of water and solvent removal.

Generally speaking, the above noted imidazolines are water soluble but as the upper limit of the chain length for the R, R' substituents is approached, water solubility decreases. Accordingly, it may be advantageous in certain cases, especially at the longer chain values for the R, R' substituents, to incorporate the imidazolines in the form of their acid salts. The acetic acid salts are particularly suitable for this purpose although the salts of other lower carboxylic acids, e.g., propionic acid, butyric acid and isobutyric acid, may be useful.

Urea-formaldehyde resins, containing one or more plasticizers according to the present invention, can be cured into highly desirable plasticized films or other products. Typically suitable curing conditions include heating at 120 to 160° C., for 10 to 60 minutes. If desired, an appropriate urea-formaldehyde polymerization catalyst, e.g., an aminol salt solution, may also be included in the plasticizer/resin mix.

The imidazolines used herein are uniquely compatible with urea-formaldehyde resins. They do not exude from the cured resin mixture under normal conditions and they impart a high degree of flexibility to the cured composition. This property of flexibility is unexpected since it is not usually associated with thermosetting resins.

Cured urea-formaldehyde resins containing at least one imidazoline derivative according to the invention may be either translucent or transparent. The resinous compositions may be elastic in some cases and they are also water-insoluble and water impervious. Accordingly, the compositions of the invention are particularly attractive for the formation of moisture protective films. Pigments may be incorporated in the plasticized resins and, if desired, the plasticized resin, with or without pigment, may be incorporated in paper, textiles or the like or used to provide surface coatings thereon. Paper containing the plasticized resin herein is not brittle, as is normally the case with usual urea-formaldehyde resins. Paper coated with the plasticized resin mixture of the invention also has a high gloss surface which does not fracture on folding.

One very unique and advantageous characteristic of the plasticized products of the invention is the ability to operate from an aqueous system. Formation of protective films of urea-formaldehyde resins plasticized with alkyd resins is known, but these require organic media such as xylene or butyl alcohol. With the present invention, films may be formed by casting a water solution of prepolymeric urea formaldehyde syrup and the plasticizer and then drying and baking to obtain a highly attractive, flexible film.

The imidazoline used herein may be incorporated into the urea-formaldehyde resin in any convenient fashion, desirably but not necessarily in aqueous solution. The resin which is used may have any degree of polymerization although it is preferably a heat-curable pre-polymerized syrup. Usually, the plasticizer will comprise from 1 to 50% by weight of the final plasticized composition, desirably 10 to 20%.

As mentioned heretofore, pigments, typically titanium dioxide, may be added to the plasticized urea formaldehyde compositions of the invention. Usually, the pigment total will amount to from 1 to 20% by weight of the final composition although other proportions can be used. It will also be appreciated that other conventional ingredients may be included in the plasticized compositions of the invention.

The invention is illustrated, but not limited, by the following examples wherein parts and percentages are by weight unless otherwise stated:

*Example I*

Four hundred eighty-six parts of diethylene triamine and 1296 parts of caprylic acid are mixed with 160 parts of xylene and the mixture is refluxed for three hours. Water is then azeotropically removed to a temperature of about 210° C. The solvent is removed to yield 2-heptyl-3(β-caprylamidoethyl)imidazoline, which has a primary and secondary amine of about 0.28 eq./g. and 12.4% nitrogen.

*Example II*

Two hundred ten parts of diethylene triamine, 688 parts of isodecanoic acid and 86 parts of xylene are treated in the same manner as in Example I to yield 2-isononyl-3(isodecanoamidoethyl)imidazoline.

*Example III*

One hundred three parts of diethylene triamine and 129 parts of xylene are mixed and 391 parts of propionic anhydride are slowly added so that the temperature does not exceed 60° C. Heating is started in a non-oxidizing atmosphere and xylene and propionic acid distilled off up to about 240° C. The mass is then held at this temperature for one hour at about 15 mm. pressure to yield 2-ethyl-3(propionamidoethyl)imidazoline.

Example IV

Three hundred thirty-seven parts of the product from Example I are mixed with 90 parts of glacial acetic acid and stirred together until homogeneous.

Example V

Two hundred fifty-seven parts of diethylene triamine, 580 parts of caproic acid and 56 parts of xylene are treated in the same manner as in Example I to yield 2-pentyl-3(caproamidoethyl)imidazoline.

Example VI

Three hundred nine parts of diethylene triamine, 864 parts of 2-ethyl-hexanoic acid and 86 parts of xylene are treated in the same manner as in Example I to yield 2-(3-heptyl)-3-(2-ethylhexamidoethyl)imidazoline.

Example VII

Three hundred nine parts of diethylene triamine, 696 parts of 2-methyl-pentanoic acid and 65 parts of xylene are treated in the same manner as in Example I to yield 2-(2-pentyl)-3(2-methylpentamidoethyl)imidazoline.

Example VIII

Three hundred nine parts of diethylene triamine and 65 parts of xylene are mixed and 474 parts of butyric anhydride are slowly added so that the temperature does not exceed 60° C. The mass is then treated in the same manner as in Example I to yield 2(n-propyl)-3(butyramidoethyl)imidazoline.

Example IX 3.6 g. of a 50% solution of a partially polymerized urea-formaldehyde resin, 0.18 g. of 2-heptyl-3($\beta$-caprylamidoethyl)imidazoline and 0.1 g. of an amino salt catalyst (i.e. 2-amino, 2-methyl propanol hydrochloride) are mixed and an even layer deposited on a glass plate by use of a draw bar. The water is removed by allowing to dry overnight. The film is baked for ten minutes at 300° F. to produce a clear, flexible film with no exuding or tackiness.

Example X

The process of Example IX was repeated using each of the imidazolines of Examples II–VIII for the imidazoline of Example IX. All films thus plasticized were flexible and water-resistant, some exhibiting transparency while others were translucent.

Example XI

A composition is made up as described in Example IX, and including 0.18 g. of a commercially available titanium dioxide. Films produced in this manner are extremely pliable and flexible, water resistant, and have the ability to secure the pigment in the film.

Example XII

The process of Example IX was repeated except that the composition was coated onto a layer of paper. Upon drying and curing, a paper product having a high gloss surface which did not fracture on folding was obtained.

It will be appreciated that various modifications may be made in the invention as described above without departing from the scope and spirit thereof. Thus, for example, it will be apparent that the urea-formaldehyde polymer may be used in different concentrations from that shown above. Additionally, in lieu of separate drying and baking steps, it may be desirable in some instances to bake the plasticized films directly thus eliminating the drying time. The plasticized urea-formaldehyde compositions may also be made into forms other than films where flexible urea-formaldehyde resins are desirable. Accordingly, the scope of the invention is defined in the following claims wherein we claim:

1. A composition comprising a urea-formaldehyde resin and, as a plasticizer therefor, a member of the group consisting of a compound which has the formula:

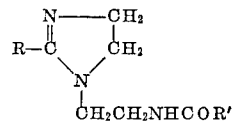

wherein R and R' are saturated alkyl groups containing from 2 to 9 carbon atoms and the water-soluble acid salts thereof.

2. The composition of claim 1 wherein said composition is heat-curable.

3. The composition of claim 1 wherein said composition is heat-cured.

4. The composition of claim 1 containing from 1 to 50% by weight of said plasticizer, based on the weight of plasticized composition.

5. The composition of claim 1 including a pigment.

6. The composition of claim 1 wherein said plasticizer is the acid salt of said compound with a carboxylic acid of the formula RCOOH wherein R is alkyl containing from 1 to 3 carbon atoms.

7. The composition of claim 1 in the form of a cured film.

8. Paper coated with the composition of claim 1.

9. The process which comprises casting a film from the composition of claim 1 in water and then drying the film to obtain a flexible, water-resistant film.

10. The process of claim 9 wherein said resin is a pre-polymeric urea-formaldehyde syrup and said film is obtained by casting an aqueous mixture of the syrup and plasticizer and then baking.

No references cited.